(12) United States Patent
Siboni et al.

(10) Patent No.: US 11,068,731 B2
(45) Date of Patent: Jul. 20, 2021

(54) VEHICLE-MOUNTED DISPLAY SYSTEM AND METHOD FOR PREVENTING VEHICULAR ACCIDENTS

(71) Applicant: FORESIGHT AUTOMOTIVE LTD., Ness Ziona (IL)

(72) Inventors: Haim Siboni, Lod (IL); Levi Zruya, Jerusalem (IL)

(73) Assignee: Foresight Automotive Ltd., Ness Ziona (IL)

( * ) Notice: Subject to any disclaimer, the term of this patent is extended or adjusted under 35 U.S.C. 154(b) by 0 days.

(21) Appl. No.: 16/308,161

(22) PCT Filed: Jun. 7, 2017

(86) PCT No.: PCT/IL2017/050639
§ 371 (c)(1),
(2) Date: Dec. 7, 2018

(87) PCT Pub. No.: WO2017/212490
PCT Pub. Date: Dec. 14, 2017

(65) Prior Publication Data
US 2019/0188506 A1 Jun. 20, 2019

(30) Foreign Application Priority Data
Jun. 8, 2016 (IL) .......................................... 246129

(51) Int. Cl.
*H04N 7/18* (2006.01)
*G06K 9/00* (2006.01)
(Continued)

(52) U.S. Cl.
CPC ............ *G06K 9/00845* (2013.01); *B60R 1/00* (2013.01); *B60R 11/04* (2013.01); *G02B 27/01* (2013.01);
(Continued)

(58) Field of Classification Search
CPC .. G06K 9/00791; G06K 9/00845; G06K 9/00; B60K 35/00; B60K 2370/739;
(Continued)

(56) References Cited

U.S. PATENT DOCUMENTS 6,714,665 B1 * 3/2004 Hanna ...................... G06K 9/00
382/117
7,561,966 B2 * 7/2009 Nakamura ........... G01C 21/365
340/461

(Continued)

FOREIGN PATENT DOCUMENTS

| CN | 101915990 A | 12/2010 |
| CN | 201736911 U | 2/2011 |

(Continued)

OTHER PUBLICATIONS

International Preliminary Report on Patentability for Application No. PCT/IL2017/050639 dated Sep. 3, 2018, 16 pages.
(Continued)

*Primary Examiner* — Gims S Philippe
(74) *Attorney, Agent, or Firm* — Alston & Bird LLP

(57) ABSTRACT

A vehicle-mounted display system for enhancing a driver's forward viewability, which comprises a forwardly directed camera mounted within an interior of the vehicle, for imaging a forwardly directed expected field of view (EFOV) of the driver; an image generator; and a processing unit in data communication with both the forwardly directed camera and the image generator. The processing unit is operable to monitor a parameter indicative of a driver's forward viewability through a front windshield of a road over which the vehicle advances during a transportation operation and to command the image generator to generate when a value of the monitored parameter deviates from a predetermined parameter range, within the vehicle interior, an EFOV-related image which is visible to the driver and is based on
(Continued)

image data received from the forwardly directed camera, to ensure the driver's forward viewability during the course of a transportation operation.

13 Claims, 7 Drawing Sheets

(51) Int. Cl.

| | | |
|---|---|---|
| *G02B 27/01* | (2006.01) | |
| *B60R 1/00* | (2006.01) | |
| *B60R 11/04* | (2006.01) | |
| *H04N 9/31* | (2006.01) | |
| *B60Q 9/00* | (2006.01) | |
| *B60R 11/00* | (2006.01) | |

(52) U.S. Cl.
CPC ....... *G06K 9/00791* (2013.01); *H04N 9/3185* (2013.01); *B60Q 9/008* (2013.01); *B60R 2011/0026* (2013.01); *B60R 2300/30* (2013.01); *G02B 2027/014* (2013.01); *G02B 2027/0123* (2013.01); *G02B 2027/0138* (2013.01); *G02B 2027/0187* (2013.01)

(58) Field of Classification Search
CPC ............ B60K 2370/21; B60K 2370/55; H04N 9/3185; H04N 5/23206; H04N 5/247; H04N 7/185; H04N 5/2259
USPC ......................................................... 348/148
See application file for complete search history.

(56) References Cited

U.S. PATENT DOCUMENTS

| | | | |
|---|---|---|---|
| 8,599,266 B2* | 12/2013 | Trivedi | ................ H04N 5/2259 348/169 |
| 8,704,653 B2 | 4/2014 | Seder et al. | |
| 2002/0140562 A1* | 10/2002 | Gutta | ..................... G08B 21/06 340/576 |
| 2003/0122930 A1* | 7/2003 | Schofield | .................. B60R 1/00 348/148 |
| 2009/0074249 A1* | 3/2009 | Moed | ................. G06K 9/00818 382/104 |
| 2010/0066832 A1 | 3/2010 | Nagahara et al. | |
| 2011/0032357 A1* | 2/2011 | Kitaura | ..................... B60R 1/00 348/148 |
| 2013/0083197 A1 | 4/2013 | Yamakage | |
| 2014/0139655 A1* | 5/2014 | Mimar | .................... G08B 21/06 348/77 |
| 2014/0160012 A1 | 6/2014 | Su | |
| 2015/0010207 A1 | 1/2015 | Inada | |
| 2016/0041386 A1 | 2/2016 | Rodriguez Moreno | |
| 2016/0101732 A1 | 4/2016 | Danz | |
| 2017/0001648 A1* | 1/2017 | An | ........................ B60W 30/09 |

FOREIGN PATENT DOCUMENTS

| | | |
|---|---|---|
| CN | 202923497 U | 5/2013 |
| CN | 105263757 | 1/2016 |
| CN | 105376526 A | 3/2016 |
| DE | 102013208971 | 11/2014 |
| DE | 102014206684 A1 | 10/2015 |
| EP | 2902747 A1 | 8/2015 |
| JP | 2005-207778 A | 8/2005 |
| JP | 2010-018201 A | 1/2010 |

OTHER PUBLICATIONS

International Search Report and Written Opinion for Application No. PCT/IL2017/050639 dated Sep. 12, 2017, 10 pages.

* cited by examiner

VEHICLE-MOUNTED DISPLAY SYSTEM AND METHOD FOR PREVENTING VEHICULAR ACCIDENTS

CROSS-REFERENCE TO RELATED APPLICATIONS

This application is a national phase entry of International Application No. PCT/IL2017/050639, filed Jun. 7, 2017, which claims priority to Israeli Patent Application No. 246129, filed Jun. 8, 2016, the entire contents of which are incorporated herein by reference.

FIELD OF THE INVENTION

The present invention relates to the field of traffic safety. More particularly, the invention relates to a display system for avoiding vehicle accidents that are liable to be caused by a driver who is not focused on the road along the vehicle's movement direction.

BACKGROUND OF THE INVENTION

Many traffic accidents result from unawareness of a driver. Nowadays, there are many objects along the road which attract the driver's attention, such as advertisements. The way to draw his attention is to place large billboards which are very prominent even in daytime, so the driver is not always focused in the vehicle's movement direction. This problem is even more severe during nighttime, when these billboards are illuminated with intense light.

Some of the billboards are computerized or connected to a data network with an ad server, such that the displayed ads are dynamic and include intimations or short video clips. These kinds of billboards attract the driver's attention even longer. So the attention of a normal driver and his focus towards the vehicle's movement direction is strongly disturbed for few seconds, during which the driver is unaware of the state of the traffic ahead. This of course, increases the risk of being involved in an accident.

Another significant cause of distracted driving is the use of a mobile phone. When a driver is focused on his mobile phone while sending a text message or even viewing the name of a caller, he obviously cannot adequately detect hazards or road signs and is at risk of being involved in an accident.

Poor driver visibility, caused for example by a snow storm, is another contributing factor to traffic accidents. When the poor driver visibility is coupled with the malfunction of visibility enhancing apparatus such as a windshield wiper or a defroster, the lack of driver visibility could have fatal repercussions. Another dangerous scenario for which lack of driver visibility is uncorrectable while driving and therefore life threatening is when a hard object such as a stone falls from a passing truck and shatters the front windshield.

All the existing methods have not yet provided satisfactory solutions to the problem of preventing impending collisions between vehicles or between a vehicle and an object, due to a driver who is not focused on the road along the vehicle's movement direction.

It is therefore an object of the present invention to provide a vehicle-mounted display system and method for avoiding vehicular accidents that are liable to be caused by driver distraction or poor visibility.

Other objects and advantages of this invention will become apparent as the description proceeds.

SUMMARY OF THE INVENTION

The present invention is directed to a vehicle-mounted display system for enhancing a driver's forward viewability, comprising a forwardly directed camera mounted within an interior of the vehicle, for imaging a forwardly directed expected field of view (EFOV) of the driver; an image generator; and a processing unit in data communication with both said forwardly directed camera and said image generator, wherein said processing unit is operable to monitor a parameter indicative of a driver's forward viewability through a front windshield of a road over which the vehicle advances during a transportation operation and to command said image generator to generate when a value of said monitored parameter deviates from a predetermined parameter range, within the vehicle interior, an EFOV-related image which is visible to the driver and is based on image data received from said forwardly directed camera, to ensure the driver's forward viewability during the course of a transportation operation.

In one embodiment, the display system further comprises a plurality of face-directed cameras in data communication with the processing unit and mounted within the vehicle interior, for capturing an image of the driver's face, wherein the monitored parameter is an instantaneous looking direction of the driver, and wherein the processing unit is operable to acquire image data from each of said plurality of face-directed cameras and to generate the instantaneous looking direction from the image data acquired from each of said plurality of face-directed cameras.

The image generator may be a repositionable projector, wherein the processing unit is additionally operable, when the instantaneous looking direction of the driver deviates from an expected forwardly directed line of sight by more than a predetermined value, to transmit at least a portion of the EFOV-related image data received from the forwardly directed camera to said projector, and to command repositioning and operation of said projector so as to project the at least a portion of the EFOV-related image onto a vehicular image surface coinciding with the instantaneous looking direction.

In one embodiment, the display system further comprises a forwardly directed camera mounted externally to the front windshield on a support element of the vehicle and in data communication with the processing unit, wherein the processing unit is operable to command the image generator to generate the EFOV-related image which is based on image data received from said forwardly directed camera forwardly mounted externally to the front windshield when the image data acquired from the forwardly directed camera mounted within the vehicle interior is indicative that the front windshield has become obscured.

The present invention is also directed to a method for maintaining a driver's forward viewability, comprising the steps of monitoring a parameter indicative of the driver's forward viewability through a front windshield of a road over which a vehicle advances during a transportation operation; and if a value of the monitored parameter value deviates from a predetermined parameter range, performing a corrective action, to display an EFOV-related image within a vehicle interior that will ensure the driver's forward viewability during the course of the transportation operation.

DETAILED DESCRIPTION OF PREFERRED EMBODIMENTS

The present invention is a vehicle-mounted display system for enhancing a driver's forward viewability during periods of driver distraction or an obscured windshield.

Figure 6:
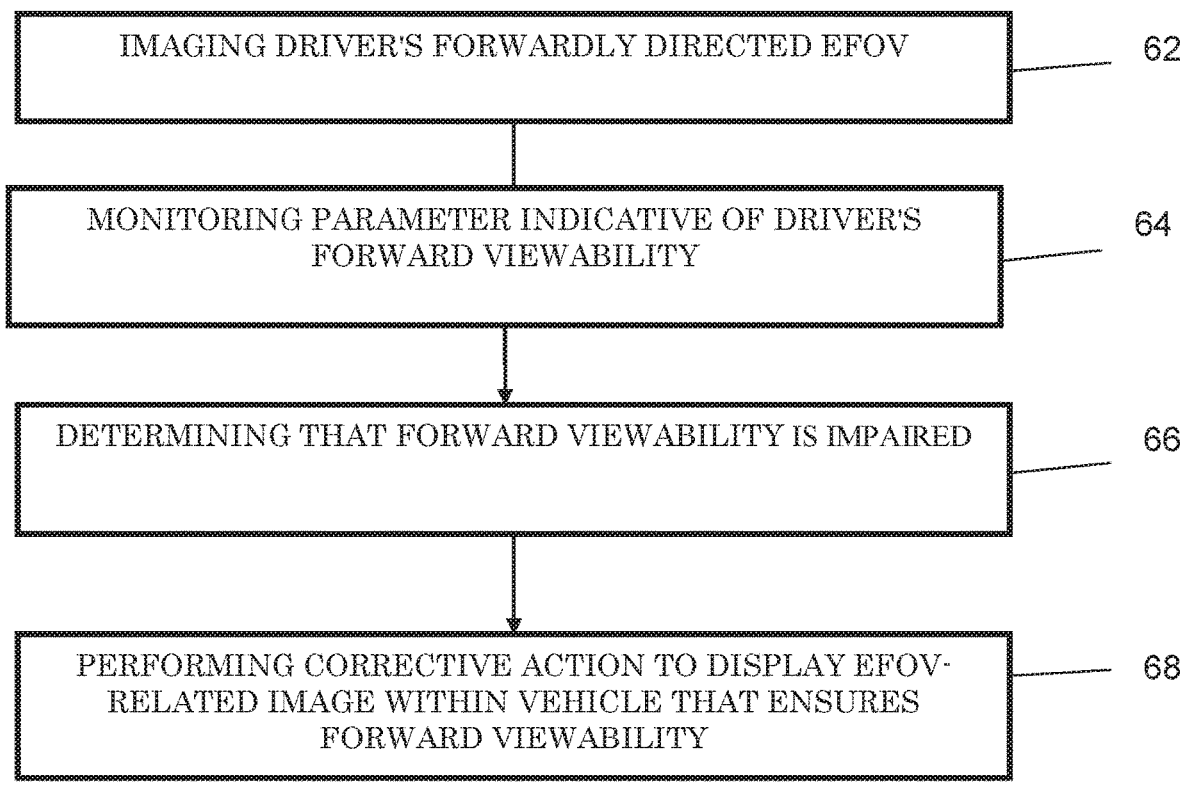
FIG. 6 is a method for maintaining a driver's forward viewability, according to an embodiment of the invention.

Broadly speaking, a method illustrated in FIG. 6 is used to maintain a driver's forward viewability. A forwardly directed camera i.e. with respect to the vehicle's movement direction, continuously images the forwardly directed expected field of view (EFOV) of the driver in step 62. For example, a centrally positioned, forwardly directed camera may cover a forwardly directed sector of 80°, ±40° about an expected, forwardly directed line of sight of the driver (which is essentially perpendicular to a plane normal to the underlying road surface and coinciding with the front windshield).

A parameter indicative of the driver's forward viewability is continuously or intermittently monitored in step 64. If for some reason, the driver's forward viewability is found to be impaired in step 66, such as when the detected parameter value deviates from a predetermined parameter range, the display system performs a corrective action in step 68, as will be described hereinafter, to display an EFOV-related image within the interior of the vehicle that will ensure the driver's forward viewability during the course of the transportation operation.

Figure 1:
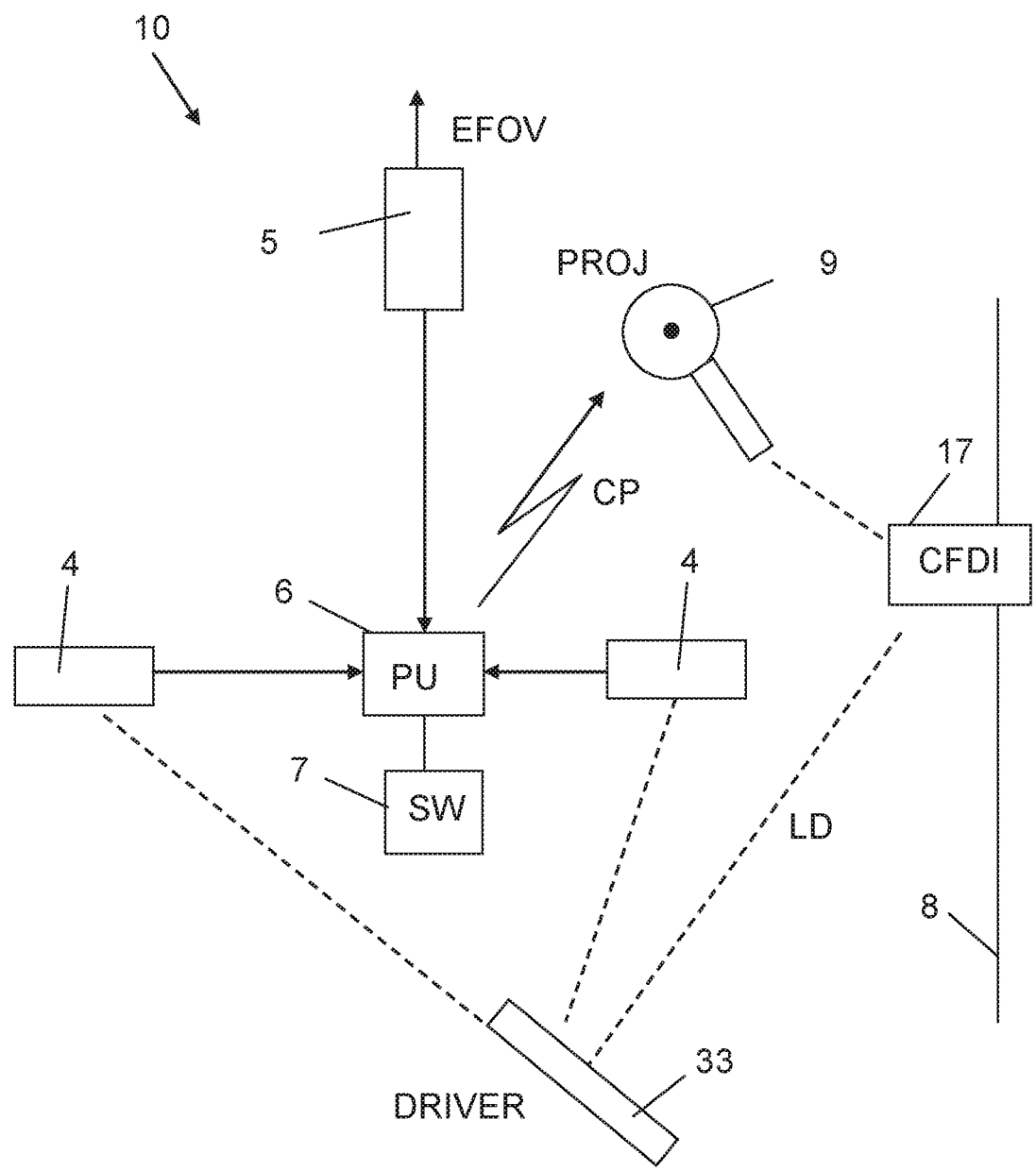
FIG. 1 is a schematic illustration of a vehicle-mounted display system for preventing vehicular accidents, according to one embodiment of the present invention.

FIG. 1 schematically illustrates a display system, generally indicated by numeral 10, according to one embodiment of the present invention by which the instantaneous looking direction of the driver is determined.

Display system 10 comprises one or more optical sensors 4, such as 2-D or 3-D cameras, which are directed to the face of the driver 33 at different angles. Each optical sensor 4 is installed inside the vehicle and is capable of providing two or three-dimensional data, following image analysis. A processing unit (PU) 6 acquires the images captured by each of the optical sensors 4 and analyzes the acquired image data according to instructions stored in a dedicated software module (SM) 7, to provide an estimation as to which direction the driver is looking at any time, by calculating the azimuth or the three-dimensional angle of his looking direction. Another camera 5 is mounted within the vehicle and is directed forwardly, such that it continuously images the forwardly directed EFOV of the driver.

Upon detecting that the instantaneous looking direction (LD) of the driver deviates from the expected forwardly directed line of sight by more than a predetermined value, processing unit 6 crops from the image captured by camera 5, a portion (e.g., 60° of the total forwardly directed field of view) and will transmit via a signal, whether a wired or a wireless signal, this cropped portion (CP) to a rotatable projector 9, which is also installed within the vehicle.

Projector 9 is configured to be automatically repositioned, for example pivotably repositioned about a vertical axis, in response to the instantaneous looking direction of driver 33 so that it will project onto a vehicular image surface 8, such as a portion of the front windshield, a side window or a side door, the cropped portion, or the entire captured forwardly directed image (CFDI) 17 if so desired, which can be viewed by the driver when his head is tilted in the instantaneous looking direction. This way, driver 33 will always be able to see the road along an expected forwardly directed field of view, even if his instantaneous looking direction substantially deviates from the expected forwardly directed direction.

The vehicular image surface 8 may be provided with a reflective or polarized layer to enhance visibility of the projected image, particularly when the image surface is transparent or translucent. Alternatively, the image surface may be a dedicated surface which is adhered or attached to each of one or more factory-manufactured vehicular surfaces and which is conducive to the visibility of the projected image.

Figure 2:
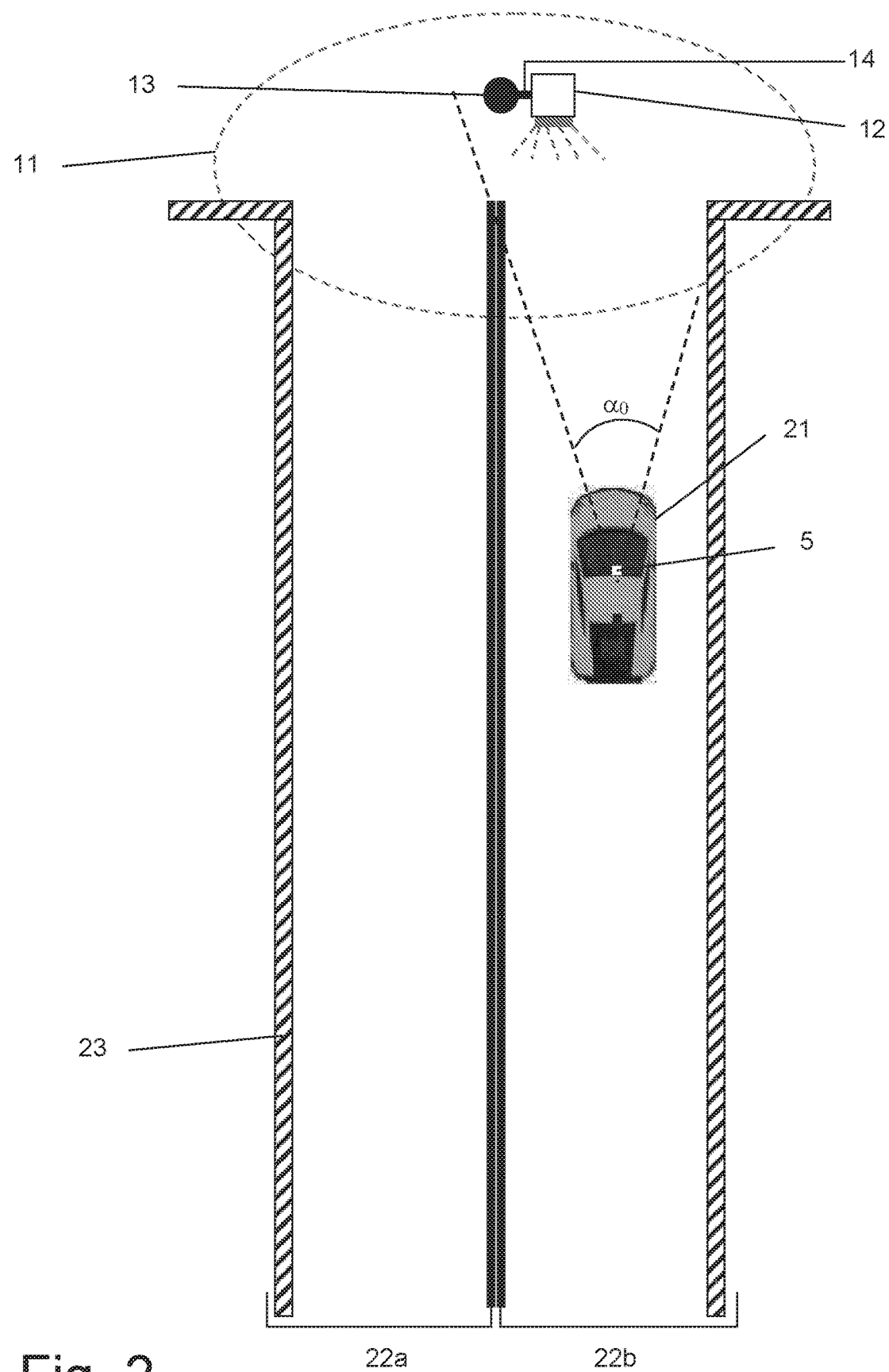
FIG. 2 schematically illustrates an implementation of the display system of FIG. 1.

FIG. 2 schematically illustrates an implementation of display system 10, in order to prevent dangerous scenarios of impending collisions between vehicles or between a vehicle and an object, due to driver distraction as a result of not being focused on the road along the vehicle's movement direction. Single forwardly directed camera 5 with a field of view $\alpha_0$ is installed on a vehicle 21, moving along a lane 22b of a road 23 with two lanes 22a and 22b.

In this scenario, vehicle 21 moves along lane 22b toward a junction 11, in which is located a traffic light 12 that is installed on a stationary post 13 via arm 14. Traffic light 12 is covered by field of view $\alpha_0$.

Normally, the driver of vehicle 21 looks forwardly and should be aware of the red light. If for example, the driver is not aware of the red light since he is looking to a different direction, the display system will detect that the instantaneous looking direction of the driver deviates from the expected forwardly directed line of sight by more than a predetermined value and will project the image covered by sector $\alpha_0$, as shown in FIG. 3.

Figure 3:
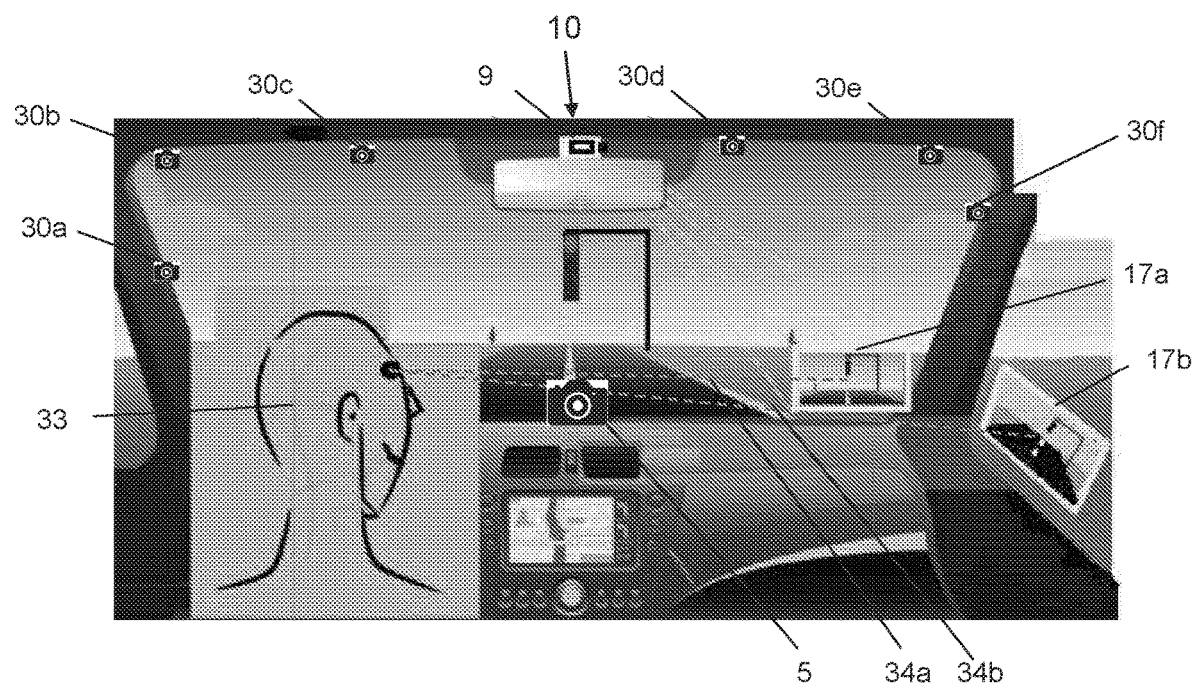
FIG. 3 is a schematic illustration of the display system of FIG. 1 as it is installed within the interior of vehicle.

FIG. 3 illustrates display system 10 as it is installed inside a vehicle, according to an embodiment of the invention. A plurality of 2-D (or 3-D) cameras, for example cameras 30a-30f which are directed to the face of the driver 33, are installed inside the vehicle. Each face-directed camera transmits 2-D (or 3-D) images to processing unit 6 (FIG. 1), which collects the images taken from several directions and, by dedicated image processing software, analyzes the data from all cameras 30a-30f and provides an estimation as to which direction the driver is looking, by calculating the azimuth of his looking direction. This analysis may be based on the orientation of a virtual line extending between anatomical landmarks of driver 33 and serving as a reference line, and on the assumption that the reference line remains at a substantially uniform height above the floor of the vehicle. The images taken by the detection cameras 30a-30f provide several aspects of the driver's face, from which the spatial location of his eyes can be calculated. As a result, the azimuth of his looking direction can be derived.

A first face-directed camera may capture a first anatomical landmark and a second face-directed camera may capture a second anatomical landmark which supplements the first landmark by probabilistic or other logical analysis. For example, a first camera captures the right and left, tragions, or the cartilaginous notch at the front of an ear, while the relative angle of the second camera captures only one tragion. The processing unit is therefore able to derive from the first camera sufficient data to generate a first virtual line between the two tragions, while it derives from the second camera sufficient data to generate a second virtual line between the right and left ectocanthi, or outer corners of the eyes. The normal to each of the first and second virtual lines is then generated and correlated based on the relative camera angle to produce the instantaneous looking direction.

Forwardly directed camera 5 is mounted on a suitable vehicular surface, such as on top of horizontal surface above the dashboard, and continuously images the expected forwardly directed line of sight of the driver.

If for example, the driver 33 turns his head slightly to the right, the detection cameras and the processing unit will detect that the azimuth 34a of his looking direction has been rotated from the expected forwardly directed line of sight. In response, the dedicated software application will crop a portion (e.g., 50-60°) of the total field of view of forwardly directed camera 5. This cropped portion will be transmitted to rotatable projector 9 which is installed inside the vehicle, for example close to the roof level. In response, rotatable projector 9 will project the selected cropped portion onto the windshield, at a location that will coincide with the driver's instantaneous looking direction. As a result, the driver will be able to see a first CFDI 17a on the lower right side of the windshield. If the driver 33 turns his head further to the right, the detection cameras and the processing unit will detect that the azimuth 34b of his looking direction has been rotated to a larger deviation from the expected forwardly directed line of sight. In response, the dedicated software application will cause the rotatable projector 9 to further rotate and to project the selected cropped portion on the right window, at a location that will coincide with the driver's instantaneous looking direction. As a result, the driver will be able to see a second CFDI 17b on the lower side of the right window.

This way, rotatable projector 9 will continuously track the azimuth of the driver's looking direction and will project the cropped portion on a vehicular surface which coincides with the driver's instantaneous looking direction.

Figure 4:
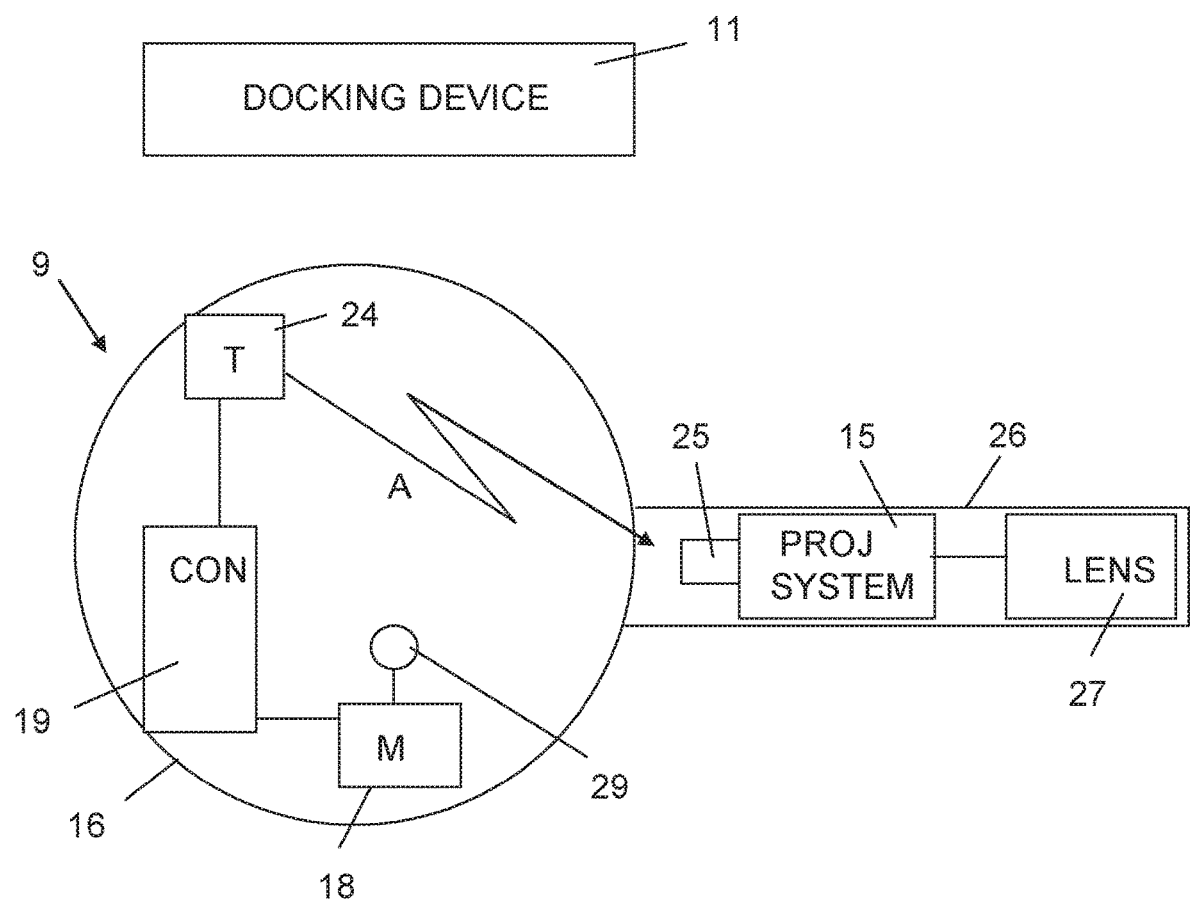
FIG. 4 is a schematic illustration of a projector used in conjunction with the display system of FIG. 1.

As schematically illustrated in FIG. 4, projector 9 comprises a projection system 15, such as a light emitting diode (LED) projection system, a miniature digital light processor (DLP) projection system, a laser-based projection system or any other projection system well known to those skilled in the art. A casing 16 in which control components are housed is movably mounted within a docking device 11, which is secured to a suitable vehicular surface such as the ceiling of the passenger compartment, a pillar connected to the floor structure, or any other support structure that permits sufficient movement to casing 16 for controlled projection of the forwardly directed image. Projection system 15 may be housing within hollow elongated appendage 26 connected to casing 16, and to be provided with a video input 25, to which the image to be projected is transmitted, wirelessly or by a wired connection, by image processing unit 6 (FIG. 1) through the mediation of controller 19.

Casing 16 may be movably mounted within docking device 11 by mounting means 29, which may be embodied by a shaft and bearing unit to facilitate pivotal or rotational motion, and optionally additionally by a vibration-minimizing bracket, or alternatively by a gyro-stabilized gimbal platform. A motor 18 in conjunction with controller 19, for example a stepper motor, drives mounting means 29 so that the projected image will be directed to the image surface that coincides with the instantaneous looking direction of the driver. Alternatively, motor 18 drives a component which is kinematically connected to casing 16.

Controller 19 is generally in data communication with image processing unit 6 by a short-range transceiver 24, such as a Bluetooth transceiver, in order to receive information as to how motor 18 is to be controlled. As the CFDI may be projected onto different image surfaces each of which located at a different distance and at a different angle from the eyes of the driver, depending on the instantaneous looking direction, projection system 15 may be equipped with an autofocus lens 27 to ensure that the projected image will be in focus at the selected image surface. In addition, projection system 15 is adapted to adjust the optical properties of the image, such as brightness and contrast, in response to the selected image surface on which it is to be projected. Controller 19 may command adjustment of projection system 15 and autofocus lens 27 by means of signal A. Discrete focal lengths of autofocus lens 27 may be stored in a memory device of processing unit 6, each of which corresponding to a different distance to a predetermined vehicular image surface on which the image is to be projected and a controlled disposition of projection system 15.

Figure 5:
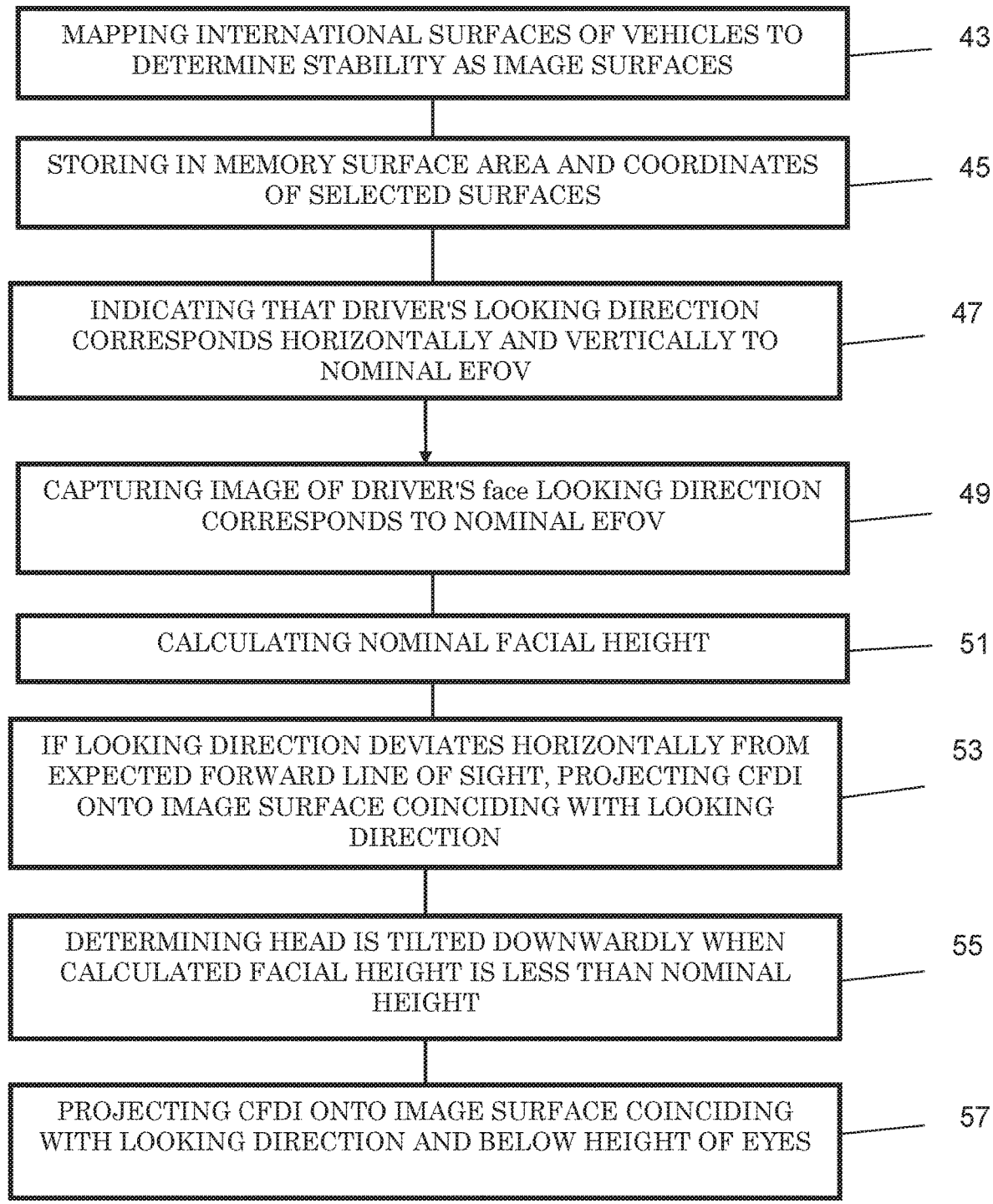
FIG. 5 is a method for projecting a captured forwardly directed image onto a vehicular image surface, according to an embodiment of the invention.

FIG. 5 illustrates a method for projecting a CFDI onto a vehicular image surface, according to an embodiment of the invention, whereby the height relative to the vehicle's floor of the image surface onto which the CFDI is projected can be controlled, in response to the driver's instantaneous looking direction.

In this embodiment, the projector may be not only rotatable about a vertical axis, but also displaceable about a pitch axis, so that the height relative to the vehicle's floor of the image surface can be controlled. For example, the projector may be configured with a first motor that permits rotation of a projector surface about a vertical axis and with an inverted U-shaped connector, to the two terminal ends thereof a projector casing is rotatably and drivingly mounted by opposed corresponding second motors, for displacement of the lens about the pitch axis.

Alternatively, an image surface at a specific height may be selected and controlled by adjusting the focal length of the lens.

A given vehicle is mapped offline in step 43, to determine which surfaces thereof are suitable for use as an image surface. Suitable selected surfaces are those which are continuous and substantially lack any elements that protrude therefrom, to limit or completely prevent image distortion as a result of being projected onto surfaces located at different focal lengths from the lens. Typical suitable internal surfaces include windows, door surfaces and floor surfaces. The surface area and coordinates relative to a reference location of the selected surfaces may be stored in memory in step 45. A combination of projector disposition and lens focal length that is suitable to project a CFDI onto each selected image surface may also be found and stored in memory.

The driver inputs to the processing unit in step 47, such as by a suitable button when he or she first sits down in the vehicle, or shortly after a transportation operation commences, an indication that the instantaneous looking direction thereof corresponds to a nominal expected field of view, that is one that deviates from the expected forwardly directed line of sight by no more than a predetermined value in both a horizontal and vertical direction. Following this driver input, one or more of the face-directed cameras capture an image of the driver's face in step 49, and the processing unit calculates in response a nominal facial height in step 51 according to stored image processing instructions. The nominal facial height is generally the menton-crinion length from the bottom of the chin to the midpoint of the hairline. If the menton is not prominent, such as when the driver is bearded, or if the crinion is not prominent, such as when the driver has bangs, another type of facial height may be calculated using different anatomical landmarks.

Alternatively, an automatic indication may be made that the driver's instantaneous looking direction corresponds to a nominal expected field of view, for example by means of the face-directed cameras and the processing unit.

During the course of the transportation operation, the face-directed cameras continue to capture an image of the driver's face. If the instantaneous looking direction of the driver deviates from the expected forwardly directed line of sight by more than a predetermined value in a horizontal direction, a CFDI is projected in step 53 onto a vehicular image surface that coincides with the driver's instantaneous looking direction, at approximately the same height as the eyes. If the calculated facial height is found to be significantly less than the nominal facial height, the processing unit determines that the driver's head is tilted downwardly in step 55 as the projection of the face is reduced. A CFDI will then be projected in step 57 onto a vehicular image surface that coincides with the driver's instantaneous looking direction, below the height of the eyes.

Figure 7:
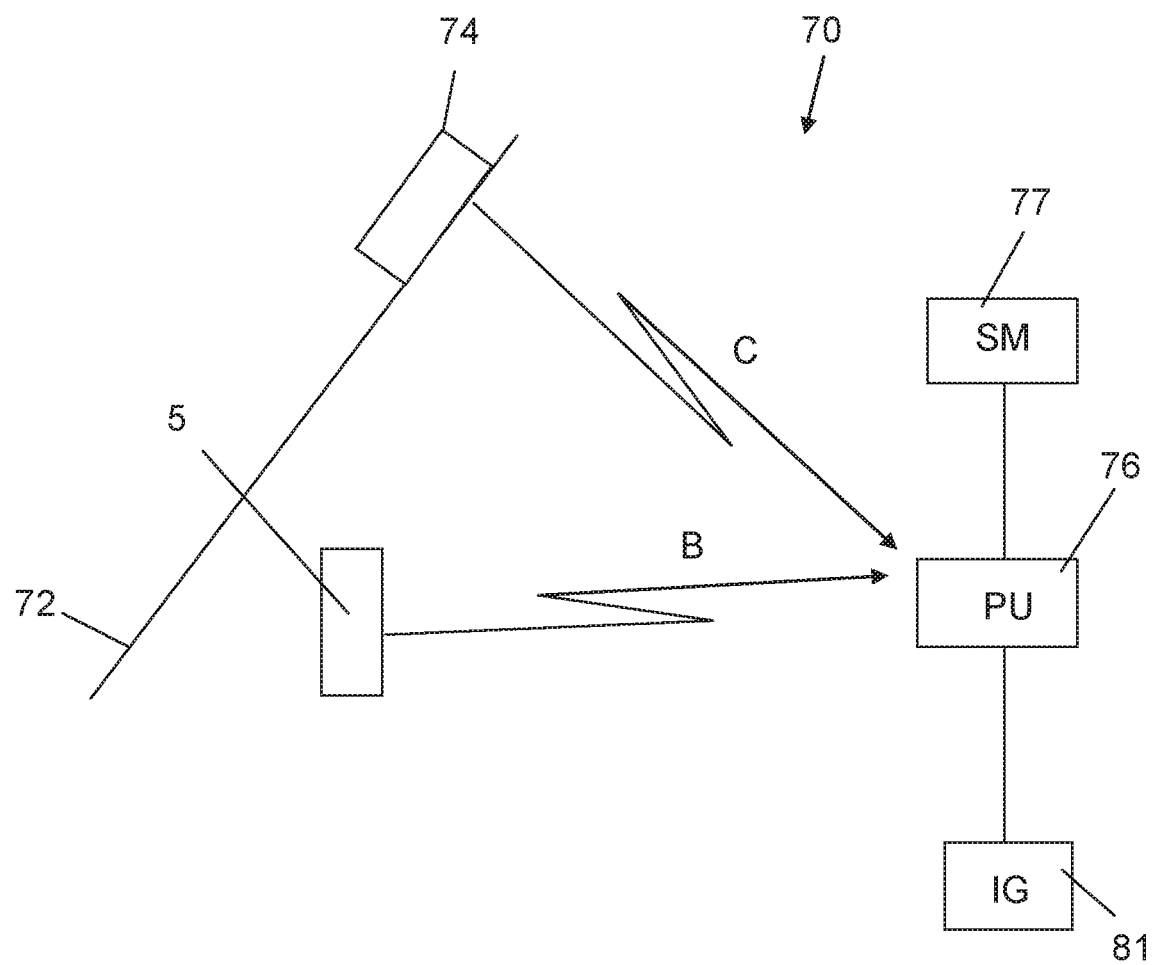
FIG. 7 is a schematic illustration of a vehicle-mounted display system for preventing vehicular accidents, according to another embodiment of the invention.

FIG. 7 schematically illustrates another embodiment of the invention whereby display system 70 is adapted to detect poor visibility conditions and to display in response an image representative of the driver's expected field of view, to allow the vehicle to be safely driven until visibility is improved.

Display system 70 comprises a first forwardly directed camera 5 for continuously or intermittently imaging the driver's forwardly directed EFOV through the vehicle's front windshield 72, and a second forwardly directed camera 74 mounted externally to front windshield 72 on a support element of the vehicle. Processing unit (PU) 76, which is in data communication with both first camera 5 and second camera 74 by a wired or wireless connection, acquires the images captured by first camera 5 via signal B and analyzes the acquired image data according to instructions stored in dedicated software module (SM) 77. When the image data acquired from first camera 5 is indicative that front windshield 72 has become obscured, processing unit 76 acquires the image data acquired from second camera 74 via signal C and commands image generator (IG) 81 to generate an EFOV-related image based on the image data associated with signal C which is displayable within the interior of the vehicle. Second camera 74 may operate only after processing unit 76 determines that front windshield 72 has become obscured, or alternatively may be continuously or intermittently operated.

Second camera 74, which may have a similar field of view as first camera 5, may be sufficiently small so as to be mounted within the frame surrounding the vehicle windshield. A shield may partially or completely surround second camera 74, to prevent the lens of the second camera from being impinged by precipitation, and particularly snow. If so desired, the shield may be configured with a resistive element.

Image generator 81, which may be a projector mounted in a central region of the vehicle, or in any region thereof rearward of the dashboard, is configured to project the EFOV-related image onto the dashboard, onto a portion of front windshield 72, or onto a vehicle-mounted media screen. Alternatively, image generator 81 is configured to inject the EFOV-related image into the user interface that is displayable on the media screen, or is integrated with the on-board computer so that a corresponding icon will be displayed on the dashboard.

In this fashion, the driver is able to continue driving despite life-endangering, extremely poor visibility conditions caused for example by a shattered front windshield or fast falling snow.

The parameter that is indicative of an obscured front windshield may be the degree of sharpness of background objects. As these background objects are generally unvarying, a sudden reduction in the sharpness of background objects is indicative that the front windshield has become obscured. The degree of sharpness of background objects may be determined by analyzing the contrast with foreground objects, or by any other suitable method. Alternatively, the parameter that is indicative of an obscured front windshield may be a refraction indicating parameter.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A vehicle-mounted display system for enhancing a driver's forward viewability, comprising:
   a) a forwardly directed camera mounted within an interior of the vehicle, said forwardly directed camera configured to capture a forwardly directed image of a road over which the vehicle advances during a transportation operation, through a front windshield of the vehicle, and along a forwardly directed expected field of view (EFOV) of the driver;
   b) an image generator which is a repositionable projector;
   c) a processing unit in data communication with both said forwardly directed camera and said image generator; and
   d) a plurality of face-directed cameras in data communication with said processing unit and mounted within the vehicle interior, for capturing an image of the driver's face,
   wherein said processing unit is operable to acquire image data from each of said plurality of face-directed cameras and to generate an instantaneous looking direction from the image data acquired from each of said plurality of face-directed cameras,
   wherein said processing unit is additionally operable to monitor the instantaneous looking direction of the driver which is indicative of a driver's forward viewability through the front windshield and, when the instantaneous looking direction of the driver deviates from an expected forwardly directed line of sight by more than a predetermined value, to:
      i. command said image generator to generate, within the vehicle interior, an image related to a cropped portion of the captured forwardly directed image (CFDI) so as to be visible to the driver, ii. transmit image data associated with the cropped portion of the CFDI received from the forwardly directed camera to said projector, and iii. command repositioning and operation of said projector so as to project the cropped portion of the CFDI onto a vehicular image surface coinciding with the instantaneous looking direction, to ensure the driver's forward viewability during the course of the transportation operation.

2. The display system according to claim 1, wherein each of the plurality of face-directed cameras is a two-dimensional or three-dimensional camera.

3. The display system according to claim 2, wherein the second forwardly directed camera is mounted on a support element of the vehicle, and wherein the processing unit is operable to command the image generator to generate a cropped portion of the CFDI which is based on image data received from the second forwardly directed camera when the image data acquired from the first forwardly directed camera is indicative that the front windshield has become obscured.

4. The display system according to claim 1, wherein the processing unit is additionally operable to determine from the image data acquired from each of the plurality of face-directed cameras that the driver's head is tilted downwardly and to command that the cropped portion of the CFDI be projected below an eye level.

5. The display system according to claim 1, wherein the forwardly directed camera mounted within the vehicle interior is a camera of a smartphone.

6. The display system according to claim 1, wherein the EFOV of the forwardly directed camera mounted within the vehicle interior ranges from 50 to 60 degrees.

7. The display system according to claim 1, wherein the image generator is configured to generate images related to the cropped portion of the CFDI which are selected from the group consisting of
a) images projected on a dashboard of the vehicle;
b) images projected on a portion of the front windshield;
c) images projected on a portion of a side window;
d) images projected on a floor surface;
e) images projected onto a vehicle-mounted media screen;
f) images injected into a user interface that is displayable on a vehicle-mounted media screen; and
g) images displayed on a dashboard of the vehicle in response to integration of the image generator with an on-board computer of the vehicle.

8. A vehicle-mounted display system for maintaining a driver's forward viewability despite life-endangering, extremely poor visibility conditions such as caused by a shattered front windshield or fast falling snow, comprising:

a) a first forwardly directed camera mounted within an interior of a vehicle, said first forwardly directed camera configured to capture a forwardly directed image of a road over which the vehicle advances during a transportation operation, through a front windshield of the vehicle, and along a forwardly directed expected field of view (EFOV) of the driver;

b) an image generator mounted within said vehicle interior;

c) a second shielded, forwardly directed camera mounted externally to the front windshield with respect to a support element of the vehicle and having a similar field of view as said first forwardly directed camera; and d) a processing unit in data communication with said first and second forwardly directed cameras and with said image generator, wherein said processing unit is operable to monitor a parameter associated with image data acquired from said first forwardly directed camera that is indicative of a driver's forward viewability and to command said image generator to generate driver-visible images of a captured forwardly directed image (CFDI) received from said second forwardly directed camera when said monitored parameter is indicative that the front windshield has become suddenly obscured, to maintain the driver's forward viewability during the course of the transportation operation.

9. The display system according to claim 8, wherein the monitored parameter is a degree of sharpness of background objects.

10. The display system according to claim 8, wherein the monitored parameter is a refraction indicating parameter.

11. The display system according to claim 8, wherein the second forwardly directed camera is shielded by a shield that prevents a lens of the second forwardly directed camera from being impinged by precipitation.

12. The display system according to claim 11, wherein the shield is configured with a resistive element.

13. The display system according to claim 8, wherein the image generator is configured to generate driver-visible images of the CFDI received from the second forwardly directed camera which are selected from the group consisting of
a) images projected on a dashboard of the vehicle;
b) images projected on a portion of the front windshield;
c) images projected onto a vehicle-mounted media screen;
d) images injected into a user interface that is displayable on a vehicle-mounted media screen; and
e) images displayed on a dashboard of the vehicle in response to integration of the image generator with an on-board computer of the vehicle.

* * * * *